(12) United States Patent
Nakagawasai

(10) Patent No.: US 11,867,458 B2
(45) Date of Patent: Jan. 9, 2024

(54) TEMPERATURE SENSOR, TEMPERATURE MEASURING DEVICE, AND TEMPERATURE MEASURING METHOD

(71) Applicant: TOKYO ELECTRON LIMITED, Tokyo (JP)

(72) Inventor: Manabu Nakagawasai, Tokyo (JP)

(73) Assignee: Tokyo Electron Limited, Tokyo (JP)

( * ) Notice: Subject to any disclaimer, the term of this patent is extended or adjusted under 35 U.S.C. 154(b) by 257 days.

(21) Appl. No.: 17/197,989

(22) Filed: Mar. 10, 2021

(65) Prior Publication Data

US 2021/0285718 A1  Sep. 16, 2021

(30) Foreign Application Priority Data

Mar. 11, 2020 (JP) ................................. 2020-041858

(51) Int. Cl.
  *F25D 29/00* (2006.01)
  *G01K 1/14* (2021.01)
  *G01K 7/18* (2006.01)
  *G01K 13/00* (2021.01)
  *G01K 1/00* (2006.01)
  (Continued)

(52) U.S. Cl.
  CPC ............. *F25D 29/005* (2013.01); *G01K 1/14* (2013.01); *G01K 7/18* (2013.01); *F25B 9/14* (2013.01);
  (Continued)

(58) Field of Classification Search
  CPC .. F25D 29/005; F25D 19/00; F25D 2700/122; G01K 1/14; G01K 7/18;
  (Continued)

(56) References Cited

U.S. PATENT DOCUMENTS 5,141,334 A * 8/1992 Castles ..................... G01K 7/01
  374/185
5,376,755 A * 12/1994 Negm ..................... H01B 12/02
  505/231
(Continued)

FOREIGN PATENT DOCUMENTS

JP  S62-220820 A  9/1987
JP  H01-110227 A  4/1989
JP  2019-016771 A  1/2019

OTHER PUBLICATIONS

Review of Scientific Instruments 41, 622 (1970); J. G. Hust (Year: 1970).*

*Primary Examiner* — Nathaniel T Woodward
*Assistant Examiner* — Philip L Cotey
(74) *Attorney, Agent, or Firm* — Fenwick & West LLP

(57) ABSTRACT

A temperature sensor, a temperature measuring device comprising the temperature sensor, and a temperature measuring method using the temperature sensor are disclosed. The temperature sensor is disposed at a measurement target having an extremely low temperature and transmits temperature measurement data to a temperature measurement output unit through a lead wire. The temperature sensor includes a housing, an electric resistor disposed in the housing, and a thermal anchor portion disposed inside or outside the housing and connected to the lead wire. Further, the lead wire extending from the thermal anchor portion is connected to the temperature measurement output unit.

20 Claims, 5 Drawing Sheets

(51) Int. Cl.
*F25D 19/00* (2006.01)
*G01K 1/08* (2021.01)
*G01K 7/16* (2006.01)
*F25B 9/14* (2006.01)
*F25B 15/00* (2006.01)
*F25B 49/02* (2006.01)
*G01K 1/16* (2006.01)

(52) U.S. Cl.
CPC .............. *F25B 15/00* (2013.01); *F25B 49/02* (2013.01); *F25D 19/00* (2013.01); *F25D 2700/122* (2013.01); *G01K 1/00* (2013.01); *G01K 1/08* (2013.01); *G01K 1/16* (2013.01); *G01K 7/16* (2013.01); *G01K 13/006* (2013.01); *G01K 2203/00* (2013.01)

(58) Field of Classification Search
CPC .. G01K 1/00; G01K 1/08; G01K 1/16; G01K 7/16; G01K 13/006; G01K 2203/00; F25B 9/14; F25B 15/00; F25B 49/02
See application file for complete search history.

(56) References Cited

U.S. PATENT DOCUMENTS

| | | | | |
|---|---|---|---|---|
| 5,584,184 | A | * | 12/1996 | Inaguchi .................. H01F 6/04 62/51.1 |
| 5,625,152 | A | * | 4/1997 | Pandorf ................ G01L 9/0072 73/756 |
| 5,638,685 | A | * | 6/1997 | Inaguchi .................. H01F 6/04 62/6 |
| 5,808,206 | A | * | 9/1998 | Pandorf .................. B32B 5/022 73/756 |
| 2008/0104968 | A1 | * | 5/2008 | Radovinsky .......... F25D 19/006 165/185 |
| 2009/0306638 | A1 | * | 12/2009 | Hillely ..................... A61B 5/01 600/549 |
| 2016/0233011 | A1 | * | 8/2016 | Eguchi .................... H01F 6/00 |
| 2018/0045754 | A1 | * | 2/2018 | Zeldov .................. G01Q 60/58 |
| 2020/0381272 | A1 | * | 12/2020 | Orimoto ........... H01L 21/68785 |
| 2020/0395526 | A1 | * | 12/2020 | Ishida ..................... G01K 7/02 |

* cited by examiner

TEMPERATURE SENSOR, TEMPERATURE MEASURING DEVICE, AND TEMPERATURE MEASURING METHOD

CROSS-REFERENCE TO RELATED APPLICATIONS

This application claims priority to Japanese Patent Application No. 2020-041858, filed on Mar. 11, 2020, the entire contents of which are incorporated herein by reference.

TECHNICAL FIELD

The present disclosure relates to a temperature sensor, a temperature measuring device, and a temperature measuring method.

BACKGROUND

Japanese Patent Application Publication No. H01-110227 discloses a cryogenic device in which a temperature of a cryogenic portion is measured at a room temperature portion by providing a temperature measuring element formed of an electric resistor at the cryogenic portion and by providing a measurement line extending from the temperature measuring element. This cryogenic device includes a first thermal anchor disposed at a predetermined mounting portion while being connected to the temperature measuring element, and a second thermal anchor attached to a predetermined mounting portion while being connected to the first thermal anchor, and the measurement line extending from the second thermal anchor to the room temperature portion. The mounting portions of the first and second thermal anchors are set such that a temperature difference between the first thermal anchor and the cryogenic portion becomes $\frac{1}{10}$ of a temperature difference between the second thermal anchor and the cryogenic portion.

SUMMARY

The present disclosure provides a temperature sensor, a temperature measuring device, and a temperature measuring method capable of suppressing breakage of a lead wire that connects an electric resistor forming the temperature sensor and a thermal anchor portion at the time of measuring, using the temperature sensor, a temperature of a measurement target having an extremely low temperature.

In accordance with an aspect of the present disclosure, there is provided a temperature sensor that is disposed at a measurement target having an extremely low temperature and transmits temperature measurement data to a temperature measurement output unit through a lead wire, the temperature sensor comprising: a housing; an electric resistor disposed in the housing; and a thermal anchor portion disposed inside or outside the housing and connected to the lead wire. Further, the lead wire extending from the thermal anchor portion is connected to the temperature measurement output unit.

BRIEF DESCRIPTION OF THE DRAWINGS

The objects and features of the present disclosure will become apparent from the following description of embodiments, given in conjunction with the accompanying drawings, in which.

DETAILED DESCRIPTION

Figure 1:
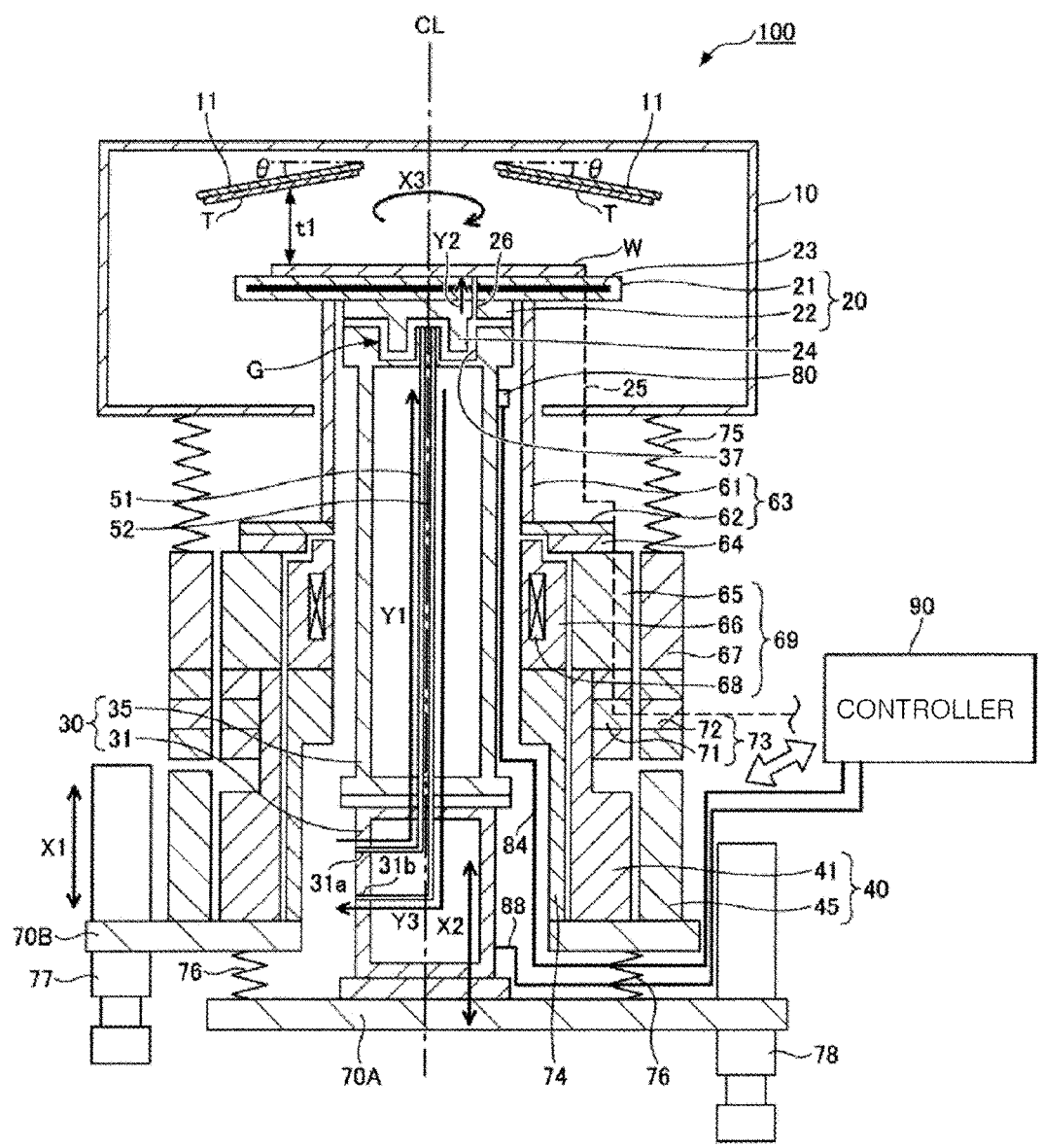
FIG. 1 is a vertical cross-sectional view showing a substrate processing apparatus including a refrigeration device which is an example of a measurement target.

Hereinafter, a temperature sensor, a temperature measuring device, and a temperature measuring method according to embodiments of the present disclosure will be described with reference to the accompanying drawings. Like reference numerals will be given to substantially like parts throughout this specification and the drawings, and redundant description thereof may be omitted.

(Substrate Processing Apparatus Including Measurement Target)

Figure 2:
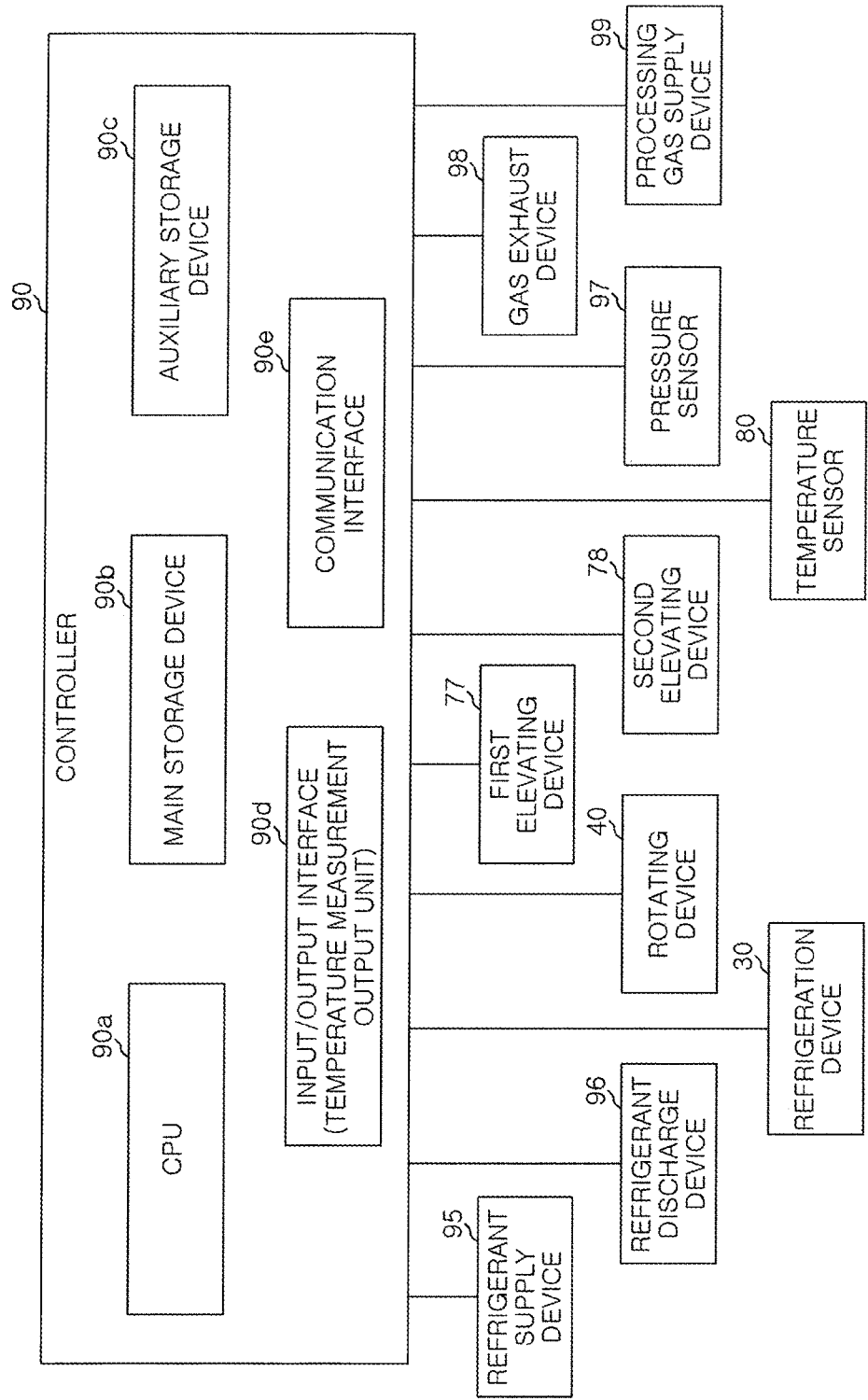
FIG. 2 depicts an example of a hardware configuration of a controller which is comprised in a substrate processing apparatus and includes a temperature measurement output unit, together with peripheral devices.

First, a substrate processing apparatus including a temperature sensor according to an embodiment and a refrigeration device as an example of a measurement target of a temperature measuring device will be described with reference to FIGS. 1 and 2. FIG. 1 is a vertical cross-sectional view showing a substrate processing apparatus including a refrigeration device as an example of a measurement target. FIG. 2 shows an example of a hardware configuration of a controller which is comprised in a substrate processing apparatus and includes a temperature measurement output unit, together with peripheral devices.

A substrate processing apparatus 100 shown in FIG. 1 is, e.g., a physical vapor deposition (PVD) apparatus for forming a magnetic film or the like on a substrate W (e.g., a semiconductor wafer) as a target object in a processing chamber 10 where an environment of ultra-high vacuum and an extremely low temperature is generated and the substrate is processed using a processing gas. Here, the ultra-high vacuum indicates a pressure atmosphere of, e.g., $10^{-5}$ Pa or less, and the extremely low temperature indicates a temperature atmosphere of $-30°$ C. or lower, e.g., about $-200°$ C. The magnetic film formed on the substrate W is used for, e.g., a tunneling magneto-resistance (TMR) element.

The substrate processing apparatus 100 includes a processing chamber 10, a substrate support 20 on which the substrate W is placed in the processing chamber 10, a refrigeration device 30, a rotating device 40 for rotating the substrate support 20, a first elevating device 77 for raising and lowering the substrate support 20, and a second elevating device 78 for raising and lowering the refrigeration device 30. The substrate processing apparatus 100 further includes a controller 90 for controlling various devices such as the refrigeration device 30, the first elevating device 77, and the like. Although it is shown in the illustrated example that the substrate processing apparatus 100 includes two separate elevating devices, i.e., the first elevating device 77 for raising and lowering the substrate support 20, and the second elevating device 78 for raising and lowering the refrigeration device 30, the substrate support 20 and the refrigeration device 30 may be raised and lowered by a common elevating device.

The refrigeration device 30 constituting the substrate processing apparatus 100 is a measurement target of the temperature sensor and the temperature measuring device according to embodiments to be described in detail below.

The substrate support 20 is disposed at a lower space in the processing chamber 10, and a plurality of target holders 11 are disposed above the substrate support 20 while being fixed with a predetermined inclination angle θ with respect to the horizontal plane. Further, different types of target T are attached to bottom surfaces of the target holders 11.

The processing chamber 10 is configured such that a pressure therein can be reduced to an ultra-high vacuum level by operating a gas exhaust device (not shown) such as a vacuum pump or the like. Further, a processing gas (e.g., nitrogen ($N_2$) gas or a rare gas such as argon (Ar), krypton (Kr), neon (Ne), or the like) required for sputtering film formation is supplied to the processing chamber 10 through a gas supply line communicating with a processing gas supply device (both not shown).

An AC voltage or a DC voltage is applied from a plasma generation power supply (not shown) to the target holder 11. When an AC voltage is applied from the plasma generation power supply to the target holder 11 and the target T, plasma is generated in the processing chamber 10, and the rare gas or the like in the processing chamber 10 is ionized. The target T is sputtered by the ionized rare gas elements or the like. Atoms or molecules of the sputtered target T are deposited on the surface of the substrate W held on the substrate support 20 while facing the target T.

Since the target T is inclined with respect to the substrate W, incident angles of the particles sputtered from the target T on the substrate W can be adjusted, and in-plane uniformity of a thickness of a film such as a magnetic film formed on the substrate W or the like can be improved. Even when the target holders 11 have the same inclination angle θ in the processing chamber 10, the incident angles of the sputtered particles with respect to the substrate W can be changed by raising and lowering the substrate support 20 so as to adjust a distance t1 between the target T and the substrate W. Accordingly, the substrate support 20 can be raised and lowered such that the distance t1 suitable for each target T can be obtained.

Although the number of targets T is not particularly limited, it is preferable to provide a plurality of different targets T in the processing chamber 10 to sequentially form different films made of different materials in one substrate processing apparatus 100. For example, in the case of depositing a magnetic film (a film containing a ferromagnetic material such as Ni, Fe, Co, or the like), it is possible to use, e.g., CoFe, FeNi, and NiFeCo as a material of the target T. Further, a material in which another element is mixed with such materials may be used as the material of the target T.

The substrate support 20 is disposed above the refrigeration device 30 formed by stacking a refrigerator 31 and a refrigeration medium 35. More specifically, the substrate support 20 is disposed with a gap G with respect to an upper surface of the refrigeration medium 35. The refrigeration medium 35 may be referred to as cold link.

The refrigerator 31 holds the refrigeration medium 35 and cools the upper surface of the refrigeration medium 35 to an extremely low temperature. The refrigerator 31 preferably uses a Gifford-McMahon (GM) cycle in view of cooling performance.

Here, both the refrigerator 31 and the refrigeration medium 35 may be measurement targets of the temperature sensor and the temperature measuring device according to the embodiments.

The refrigeration medium 35 is fixed on the refrigerator 31, and an upper portion of the refrigeration medium 35 is accommodated in the processing chamber 10. The refrigeration medium 35 is made of copper (Cu) or the like having high thermal conductivity, and has a substantially cylindrical outer shape. The refrigeration medium 35 is disposed such that the center thereof coincides with a central axis CL of the substrate support 20.

A refrigerant supply channel 51 (an example of a refrigerant channel) for supplying a refrigerant (refrigeration gas) to the gap G between the refrigeration medium 35 and the substrate support 20 and a refrigerant discharge channel 52 (an example of a refrigerant channel) for discharging a refrigerant whose temperature is increased by heat transfer from the substrate support 20 are disposed in the refrigeration medium 35 and the refrigerator 31. Further, the refrigerant supply channel 51 and the refrigerant discharge channel 52 are fixed to fixing portions 31*a* and 31*b* on a wall surface of the refrigerator 31, respectively. A line communicating with a refrigerant supply device and a line communicating with a refrigerant discharge device (both not shown) are connected to the fixing portions 31*a* and 31*b*, respectively.

The refrigerant supplied from the refrigerant supply device flows through the refrigerant supply channel 51 in a Y1 direction and is supplied to the gap G. On the other hand, the refrigerant discharged from the gap G flows through the refrigerant discharge channel 52 in a Y3 direction and is discharged to the refrigerant discharge device. The refrigerant supply channel and the refrigerant discharge channel may be the same channel. As the refrigerant supplied to the gap G to cool the substrate support 20, helium (He) gas having high thermal conductivity is preferably used.

The substrate support 20 has an upper first plate 21 on which the substrate W is placed, and a lower second plate 22 is stacked on the first plate 21. Both plates are made of copper (Cu) having high thermal conductivity. The first plate 21 includes an electrostatic chuck having a chuck electrode 23 embedded in a dielectric film. A predetermined electric potential is applied to the chuck electrode 23 through a wiring 25. With this configuration, the substrate W can be tightly adhered to the electrostatic chuck and the substrate W can be fixed to the upper surface of the substrate support 20. The substrate support 20 does not necessarily have the stacked structure of the first plate 21 and the second plate 22. Instead, the substrate support 20 may be a single plate, or may be integrally formed by sintering or the like.

The substrate support 20 has a through-hole 26 vertically penetrating through the first plate 21 and the second plate 22. The through-hole 26 communicates with the gap G disposed below the substrate support 20, and the refrigerant supplied to the gap G is supplied in a Y2 direction to the gap between the upper surface of the substrate support 20 (electrostatic chuck) and a backside of the substrate W through the through-hole 26. Accordingly, it is possible to efficiently transfer the cold heat of the refrigerant and the refrigeration medium 35 to the substrate W. In the illustrated example, the refrigerant flowing through the refrigerant supply channel 51 is supplied to the backside of the substrate W through the through-hole 26, and the refrigerant discharged through the through-hole 26 flows through the refrigerant discharge channel 52 and is discharged. However, the refrigerant may be supplied and discharged in a different manner. For example, the through-hole 26 may be provided with an independent refrigerant channel other than the refrigerant supply channel 51 and the refrigerant discharge channel 52, and the refrigerant through the through-hole 26 can be supplied or discharged by the independent refrigerant channel.

A protrusion 24 protruding toward the refrigeration medium 35 is formed on a bottom surface of the second plate 22 constituting the substrate support 20. The protrusion 24 in the illustrated example is an annular protrusion surrounding the central axis CL of the substrate support 20. A recess 37 is formed on the upper surface of the refrigeration medium 35 facing the protrusion 24 of the substrate support 20 so that the protrusion 24 is fitted thereinto. The recess 37 in the illustrated example has an annular shape surrounding the central axis CL of the substrate support 20.

The substrate support 20 is supported by an outer cylinder 63. The outer cylinder 63 is disposed to cover an outer peripheral surface of the upper portion of the refrigeration medium 35. An upper portion of the outer cylinder 63 enters inside the processing chamber 10 and supports the substrate support 20 in the processing chamber 10. The outer cylinder 63 has a cylindrical portion 61 with its inner diameter slightly greater than an outer diameter of the refrigeration medium 35, and a flange portion 62 extending outward on a bottom surface of the cylindrical portion 61. The cylindrical portion 61 directly supports the substrate support 20. The cylindrical portion 61 and the flange portion 62 are made of a metal such as stainless steel or the like.

A heat insulating member 64 is connected to a bottom surface of the flange portion 62. The heat insulating member 64 has a substantially cylindrical shape extending coaxially with the flange portion 62, and is fixed to the bottom surface of the flange portion 62. The heat insulating member 64 is made of ceramics such as alumina or the like. A magnetic fluid seal unit 69 is disposed on a bottom surface of the heat insulating member 64.

The magnetic fluid seal unit 69 includes a rotating portion 65, an inner fixing portion 66, an outer fixing portion 67, and a heating portion 68. The rotating portion 65 has a substantially cylindrical shape extending coaxially with the heat insulating member 64, and is fixed to the bottom surface of the heat insulating member 64. In other words, the rotating portion 65 is connected to the outer cylinder 63 with the heat insulating member 64 disposed therebetween.

The inner fixing portion 66 is disposed between the refrigeration medium 35 and the rotating portion 65 with a magnetic fluid disposed therebetween. The inner fixing portion 66 is formed in a substantially cylindrical shape with its inner diameter greater than an outer diameter of the refrigeration medium 35 and its outer diameter smaller than an inner diameter of the rotating portion 65. The outer fixing portion 67 is disposed outside the rotating portion 65 with a magnetic fluid disposed therebetween. The outer fixing portion 67 is formed in a substantially cylindrical shape with its inner diameter greater than an outer diameter of the rotating portion 65. The heating portion 68 is embedded in the inner fixing portion 66 and heats the entire magnetic fluid seal unit 69.

A substantially cylindrical bellows 75 is disposed between an upper surface of the outer fixing portion 67 and a bottom surface of the processing chamber 10. The bellows 75 has a metal bellows structure that can be expanded and contracted in a vertical direction. The bellows 75 surrounds an upper portion of the refrigeration medium 35, a lower portion of the outer cylinder 63, and the heat insulating member 64, and separates a depressurizable inner space of the processing chamber 10 and an outer space of the processing chamber 10.

A slip ring 73 is disposed below the magnetic fluid seal unit 69. The slip ring 73 has a rotating body 71 including a metal ring and a fixed body 72 including a brush. The rotating body 71 has a substantially cylindrical shape extending coaxially with the rotating portion 65 of the magnetic fluid seal unit 69, and is fixed to the bottom surface of the rotating portion 65. The fixed body 72 is formed in a substantially cylindrical shape with its inner diameter slightly larger than an outer diameter of the rotating body 71. The slip ring 73 is electrically connected to a DC power supply (not shown), and supplies a power supplied from the DC power supply to the wiring 25 via the brush of the fixed body 72 and the metal ring of the rotating body 71. The rotating body 71 constituting the slip ring 73 is attached to the rotating device 40. The slip ring may have a structure other than a brush structure, e.g., a non-contact power supply structure, a structure having a mercury-free liquid or a conductive liquid, or the like.

The rotating device 40 is a direct drive motor having a rotor 41 and a stator 45. The rotor 41 has a substantially cylindrical shape extending coaxially with the rotating body 71 of the slip ring 73, and is fixed to the rotating body 71. The stator 45 is formed in a substantially cylindrical shape with its inner diameter greater than an outer diameter of the rotor 41. With this configuration, when the rotor 41 rotates, the rotating body 71, the rotating portion 65, the outer cylinder 63, and the substrate support 20 rotate in a X3 direction with respect to the refrigeration medium 35. The rotating device is not necessarily the direct drive motor, and may include a servomotor and a transmission belt.

A heat insulating body 74 having a vacuum insulated double-walled structure is disposed around the refrigerator 31 and the refrigeration medium 35. In the illustrated example, the heat insulating body 74 is disposed between the refrigerator 31 and the rotor 41 and between a portion below the refrigeration medium 35 and the rotor 41. With this configuration, the transfer of the cold heat from the refrigerator 31 and the refrigeration medium 35 to the rotor 41 can be suppressed.

The refrigerator 31 is fixed to an upper surface of a first support 70A that is attached to and vertically movable with respect to the second elevating device 78. On the other hand, the rotating device 40 and the heat insulating body 74 are fixed to an upper surface of a second support 70B that is attached to and vertically movable with respect to the first elevating device 77. A substantially cylindrical bellows 76 surrounding the refrigerator 31 is disposed between the upper surface of the first support 70A and a bottom surface of the second support 70B. Similarly to the bellows 75, the bellows 76 has a metal bellows structure that can be expanded and contracted in the vertical direction.

A temperature sensor 80 for detecting a temperature of the gap G or the like and a pressure sensor (not shown) for detecting a pressure of the gap G or the like are disposed above the refrigeration medium 35. As the temperature sensor 80, it is possible to use, e.g., a low temperature sensor such as a platinum resistance temperature sensor or the like. The temperature sensor 80 is connected to the controller 90 by a lead wire 84 (in a wired manner), and temperature measurement data measured by the temperature sensor 80 is transmitted to the controller 90 at any time. Although FIG. 1 shows that the temperature sensor 80 is disposed near the refrigeration medium 35, particularly near the gap G where temperature control is particularly desired, the temperature sensor 80 may be disposed at the refrigerator 31. The temperature measurement data transmitted to the controller 90 is outputted to the temperature measurement output unit included in the controller 90. The temperature sensor 80 or the like will be described in detail below.

Among the components of the substrate processing apparatus 100, the refrigeration device 30 is configured to be raised and lowered in the X2 direction by the second elevating device 78, and the components other than the refrigeration device 30 and the processing chamber 10 are configured to be raised and lowered in the X1 direction by the first elevating device 77.

A change in the gap G between the substrate support 20 and the refrigeration medium 35 can be compensated for by raising and lowering the refrigeration device 30 using the second elevating device 78. Specifically, the refrigeration medium 35 is contracted by about several mm due to its cold heat, and, thus, the height (or width) of the gap G may be changed. When the refrigeration medium 35 is thermally contracted with respect to the substrate support 20 fixed at a predetermined height and the gap G is changed in a film forming process, the vertical movement of the refrigeration device 30 is precisely controlled by the second elevating device 78. With this control, it is possible to deal with the change in the gap G and to continue the film forming process while maintaining the initial gap G The distance t1 between the target T and the substrate W can be adjusted by raising and lowering the substrate support 20 in the processing chamber 10 using the first elevating device 77. The distance t1 is appropriately adjusted depending on the type of the target T. When the substrate support 20 is raised and lowered to adjust the distance t1, the controller 90 performs synchronous control of the first elevating device 77 and the second elevating device 78. Since the controller 90 performs the synchronous control of the first elevating device 77 and the second elevating device 78, it is possible to control the vertical movement of both the substrate support 20 and the refrigeration device 30 while maintaining the initial gap G.

The controller 90 is a computer. As shown in FIG. 2, the controller 90 includes a central processing unit (CPU) 90$a$, a main storage device 90$b$, an auxiliary storage device 90$c$, an input/output interface 90$d$, and a communication interface 90$e$ that are connected with one another by a connection bus. Here, the input/output interface 90$d$ serves as the temperature measurement output unit.

The main storage device 90$b$ and the auxiliary storage device 90$c$ are computer-readable recording media. The above components may be provided individually, or some components may not be provided.

The CPU 90$a$ is also referred to as a microprocessor (MPU) or a processor, and may be a single processor or a multiprocessor. The CPU 90$a$ is a central processing unit for controlling the entire controller 90. The CPU 90$a$ invokes e.g., a program stored in the auxiliary storage device 90$c$ into a work area of the main storage device 90$b$ for execution. Further, the CPU 90$a$ controls peripheral devices by executing the program, so that a function corresponding to a predetermined purpose is realized.

The main storage device 90$b$ stores a computer program executed by the CPU 90$a$, data processed by the CPU 90$a$, or the like. The main storage device 90$b$ includes, e.g., a flash memory, a random access memory (RAM), or a read only memory (ROM).

The auxiliary storage device 90$c$ stores various programs and various data in a storage medium in a readable and writable form. The auxiliary storage device 90$c$ is also referred to as "external storage device." The auxiliary storage device 90$c$ stores, e.g., an operating system (OS), various programs, various tables, and the like.

The OS includes, e.g., a communication interface program for transferring and receiving data to and from an external device connected through the communication interface 90$e$.

The auxiliary storage device 90$c$ is used as, e.g., an auxiliary storage area of the main storage device 90$b$, and stores computer programs executed by the CPU 90$a$, data processed by the CPU 90$a$, and the like. The auxiliary storage device 90$c$ is a silicon disk including a non-volatile semiconductor memory (flash memory, erasable programmable ROM (EPROM)), a hard disk drive (HDD) device, a solid state drive device, or the like. Further, the auxiliary storage device 90$c$ may be a removable recording medium drive device such as a CD drive device, a DVD drive device, a BD drive device, or the like. The removable recording medium may be a CD, a DVD, a BD, a universal serial bus (USB), a memory, a secure digital (SD) memory card, or the like.

The communication interface 90$e$ is an interface for a network connected to the controller 90.

The input/output interface 90$d$, which is an interface for inputting/outputting data to/from a device connected to the controller 90, includes the temperature measurement output unit for outputting and displaying the temperature measurement data transmitted from the temperature sensor 80. The input/output interface 90$d$ is connected to, e.g., a keyboard, a pointing device such as a touch panel or a mouse, an input device such as a microphone, or the like. The controller 90 receives an operation instruction or the like from an operator of the input device through the input/output interface 90$d$. Further, the input/output interface 90$d$ is connected to, e.g., a display device such as a liquid crystal panel (LCD), an organic electroluminescence (EL) panel, and an output device such as a printer, a speaker, or the like. The controller 90 outputs data or information processed by the CPU 90$a$ and data or information stored in the main storage device 90$b$ and the auxiliary storage device 90$c$ through the input/output interface 90$d$.

The temperature sensor 80 is connected to the input/output interface 90$d$ (the temperature measurement output unit) in a wired manner as described above. Further, the refrigerator 31 is connected to the input/output interface 90$d$ by a signal line 88 (in a wired manner). The controller 90 controls the operation of various peripheral devices.

The peripheral devices include a refrigerant supply device 95, a refrigerant discharge device 96, the refrigeration device 30, the rotating device 40, the first elevating device 77, the second elevating device 78, the temperature sensor 80, a pressure sensor 97, a gas exhaust device 98, a processing gas supply device 99, and the like.

The CPU 90$a$ executes a predetermined process based on a recipe stored in a storage area such as a ROM or the like. Control information on processing conditions of the substrate processing apparatus 100 is set in the recipe. The control information includes, e.g., a gas flow rate, a pressure in the processing chamber 10, a temperature in the processing chamber 10, a temperature of the substrate support 20, a temperature of the refrigerant supplied to the gap G, a height and a width of the gap G, various processing times, and the like.

The controller 90 controls the refrigerant supply device 95, the refrigerant discharge device 96, and the refrigeration device 30 such that that an initial temperature and an initial pressure of the gap G can be maintained based on the measurement data (monitor information) of the temperature sensor 80, the pressure sensor, or the like. The controller 90 also controls the vertical movement of the second elevating device 78 to precisely raise and lower the refrigeration device 30 such that the changes in the height (or the width) of the gap G due to the thermal contraction of the refrigeration medium 35 can be compensated for. The thermal contraction of the refrigeration medium 35 is caused by the transfer of the cold heat from the refrigerator 31 to the refrigeration medium 35 or by the flow of the refrigerant in the refrigerant supply channel 51. Since the controller 90 maintains the initial gap G, it is possible to continue the film forming process while controlling the substrate W to a desired temperature. Further, the controller 90 synchronously controls the first elevating device 77 and the second elevating device 78. Due to the synchronous control, the substrate support 20 (and the upper portion of the refrigeration device 30) is raised and lowered in the processing chamber 10 while maintaining the initial gap G, and the distance t1 between the target T and the substrate W is adjusted to a desirable level.

(Temperature Sensor According to the First Embodiment)

Figure 3:
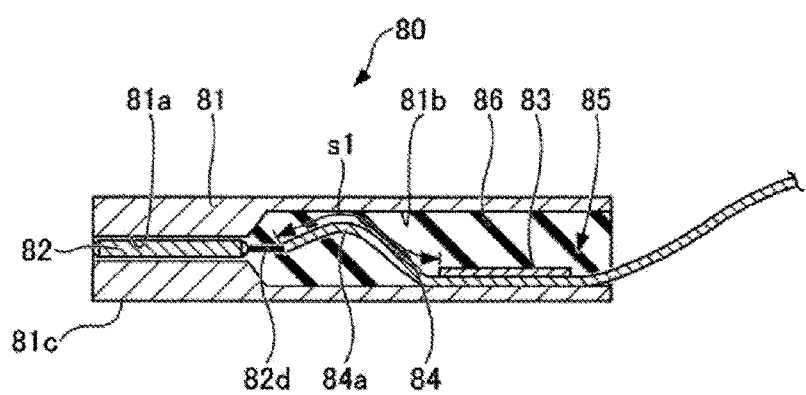
FIG. 3 represents a vertical cross-sectional view showing an example of a temperature sensor according to a first embodiment.

Next, an example of the temperature sensor according to the first embodiment will be described with reference to FIG. 3. Here, FIG. 3 represents a vertical cross-sectional view showing an example of the temperature sensor according to the first embodiment.

The illustrated temperature sensor 80 is suitable for measuring a temperature of a measurement target having an extremely low temperature, such as the refrigeration device 30. The temperature sensor 80 includes a housing 81, an electric resistor 82 accommodated in a narrow space 81a formed in the housing, and the lead wire 84 accommodated in a wide space 81b communicating with the narrow space 81a.

The housing 81 is made of copper, stainless steel, or the like. In FIG. 3, a bottom surface of the housing 81 serves as a mounting surface 81c attached to a side surface of the measurement target. Further, the electric resistor 82 is a wire-wound resistance element, a thin film resistance element, or the like, and made of silicon diode, platinum, platinum cobalt, ruthenium oxide, germanium, or the like.

A lead line 82d extends from the end of the electric resistor 82, and an end of the lead wire 84 is connected to an end of the lead line 82d. For example, a four-core wire including two current wires and two voltage wires can be used for the lead wire 84, and an ultrafine wire of about 0.2 mm can be used for the lead wire 84.

In the wide space 81b, the lead wire 84 has a curved portion 84a having a curved length s1. Further, the lead wire 84 is in contact with an inner wall surface of the wide space 81b at a rear portion of the curved portion 84a and is fixed to the inner wall surface of the wide space 81b by an adhesive tape 83 to form a thermal anchor portion 85. In other words, the thermal anchor portion 85 is formed by fixing a part of the lead wire 84 to the housing 81. The thermal anchor portion 85 has an equal temperature as a temperature measurement point of the measurement target, and can block an external heat inputted through the lead wire 84. Although the thermal anchor portion 85 is disposed inside the housing 81 in the illustrated example, the present disclosure is not limited thereto. For example, two holes may be formed in the mounting surface 81c such that the lead wire 84 passes through one hole from the inside of the housing 81 to the outside of the mounting surface 81c and returns to the inside of the housing 81 through the other hole. In this case, the thermal anchor portion is fixed on the mounting surface 81c.

The curved portion 84a of the lead wire 84 is disposed between the electric resistor 82 and the thermal anchor portion 85. The electric resistor 82 and the thermal anchor portion 85 are connected by the curved portion 84a (extending in a non-linear shape) that has a margin due to the length s1. With this configuration, when the measurement target having an extremely low temperature is thermally expanded or contracted, the curved portion 84a can absorb deformation, and the generation of tensile stress or the like in the curved portion 84a can be suppressed.

The lead wire 84 may have a meandering shape or a spiral shape (a meandering portion or a spiral portion) instead of having the curved portion 84a, and the electric resistor 82 and the thermal anchor portion 85 may be connected by the meandering portion of the lead wire 84. Further, the lead wire 84 is not necessarily fixed to the inner wall surface of the wide space 81b using an adhesive tape, and may be fixed thereto using an adhesive layer capable of dealing with an extremely low temperatures or by a mechanical method for fixing a metal member that covers the lead wire 84 to the inner wall surface.

In a state where the lead wire 84 forms the curved portion 84a and the thermal anchor portion 85 in the wide space 81b, a blocking body 86 made of a resin capable of dealing with an extremely low temperature is disposed in the wide space 81b. The blocking body 86 is an elastic body or a viscoelastic body, and is made of a deformable resin that does not hinder displacement of the lead wire 84 having the curved portion 84a.

In the temperature sensor 80, the electric resistance 82 and the thermal anchor portion 85 are arranged close to each other in the housing 81, so that a compact temperature sensor can be formed and easily attached to and detached from the measurement target having an extremely low temperature.

Further, it is possible to solve various problems in the conventional temperature sensor that may occur when the thermal anchor is fixed at a position distant from the temperature sensor in the measurement target. For example, when the temperature sensor and the thermal anchor connected to each other through the lead wire are fixed at positions distant from each other in the measurement target, tensile stress or the like is generated in the lead wire due to the thermal expansion or contraction of the measurement target having an extremely low temperature, which may result in fatigue wire breakage.

In addition, for example, when a part of the lead wire is attached to the side surface of the measurement target with an adhesive layer disposed therebetween to form a thermal anchor or when a part of the lead wire is removed from the side surface of the measurement target, an excessive external force may be applied to the lead wire and cause wire breakage.

In the temperature sensor 80, since the electric resistor 82 and the thermal anchor portion 85 are arranged close to each other in the housing 81, the generation of tensile stress or the like in the lead wire 84 (the curved portion 84a) between the electric resistor 82 and the thermal anchor portion 85 is avoided, and fatigue wire breakage is suppressed. The fatigue wire breakage is suppressed also because the lead wire 84 that connects the electric resistor 82 and the thermal anchor portion 85 has the curved portion 84a having a length with a margin.

Further, in the temperature sensor 80, since the thermal anchor portion 85 is accommodated in the housing 81, it is not necessary to install or remove the thermal anchor at a position distant from the temperature sensor, which suppresses the breakage of the lead wire.

(Temperature Sensor According to Second Embodiment)

Figure 4:
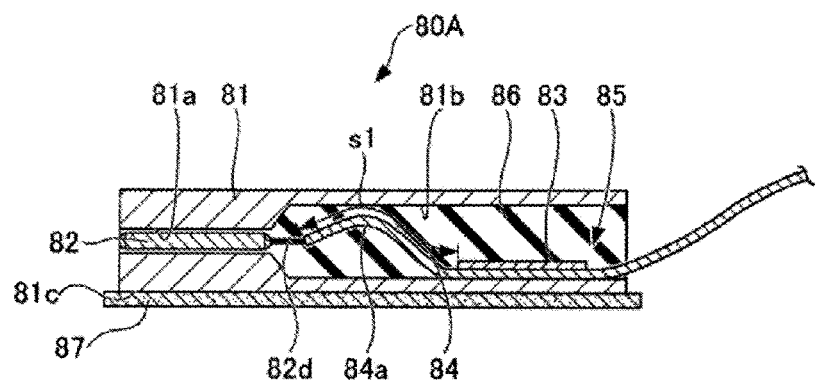
FIG. 4 describes a vertical cross-sectional view showing an example of a temperature sensor according to a second embodiment.

Next, an example of a temperature sensor according to a second embodiment will be described with reference to FIG. 4. Here, FIG. 4 is a vertical cross-sectional view showing an example of the temperature sensor according to the second embodiment.

An illustrated temperature sensor 80A includes a functional member 87 that promotes thermal conductivity between the measurement target and the housing 81 on the mounting surface 81c of the housing 81. The other configurations of the temperature sensor 80A are the same as those of the temperature sensor 80.

The functional member 87 may be made of, e.g., an indium sheet having good surface contact, a carbon-based sheet having good thermal conductivity, silicone-based or silver-based liquid grease, or the like. The functional member 87 made of these materials is resistant to a low temperature and discharges a small amount of gas, so that it is possible to suppress a contact thermal resistance between the temperature sensor 80A and the measurement target.

(Temperature Measuring Device and Temperature Measuring Method According to First Embodiment)

Next, an example of a temperature measuring device and a temperature measuring method according to the first embodiment will be described with reference to FIG. 5. Here, FIG. 5 is a schematic view showing an example of the temperature measuring device according to the first embodiment.

Figure 5:
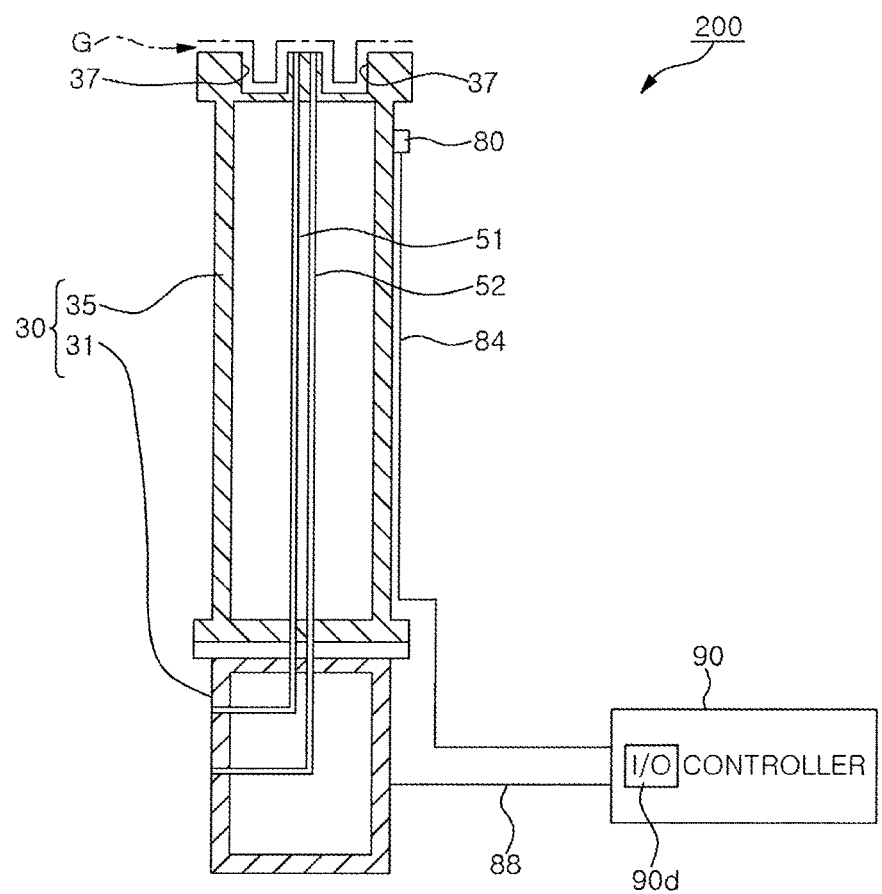
FIG. 5 schematically shows an example of a temperature measuring device according to the first embodiment.

A measurement target whose temperature is measured by a temperature measuring device 200 shown in FIG. 5 is the refrigeration medium 35 constituting the refrigeration device 30 shown in FIG. 1. In FIG. 5, the refrigeration device 30 of the substrate processing apparatus 100 is separately illustrated. Although the temperature sensor 80 is illustrated as a component of the temperature measuring device 200, the temperature sensor 80A may be used instead of the temperature sensor 80.

The temperature measuring device 200 includes the temperature sensor 80 and the temperature measurement output unit 90d included in the controller 90. The temperature sensor 80 and the temperature measurement output unit 90d are electrically connected by the lead wire 84 (wired temperature sensor), and the temperature measurement data measured by the temperature sensor 80 is transmitted to the temperature measurement output unit 90d through the lead wire 84. Here, the controller 90 is disposed in a room temperature environment.

The refrigerator 31 and the controller 90 are connected to each other by the signal line 88. The controller 90 controls a temperature of the gap G above the refrigeration medium 35 to a desired temperature based on the temperature measurement data transmitted from the temperature sensor 80. Specifically, the temperature of the gap G is controlled by controlling the temperature of the refrigerant supply channel 51 through which the refrigerant supplied to the gap G flows.

In the temperature measuring device 200, in order to control the temperature of the refrigerator 31, the temperature sensor 80 is disposed at a position close to the gap G below the substrate support where the temperature control is most desired. In other words, the temperature sensor 80 serves as a reference temperature sensor for controlling the temperature of the refrigerant for controlling the temperature of the refrigerator 31. With this configuration, it is possible to control the temperature of the gap G with a minimum time delay.

The temperature measurement method according to the first embodiment includes the following steps. First, the temperature sensor 80 is attached to the refrigeration medium 35 as a measurement target having an extremely low temperature, and the lead wire 84 extending from the temperature sensor 80 is connected to the temperature measurement output unit 90d (the process of attaching the temperature sensor to the measurement target and connecting the lead wire to the temperature measurement output unit).

Next, a temperature of the side surface of the refrigeration medium 35 is measured by the temperature sensor 80; the temperature measurement data is transmitted to the temperature measurement output unit 90d and outputted to a display screen or the like; and a temperature of the refrigerator 31 is controlled based on the temperature measurement data (the process of outputting the temperature measurement data measured by the temperature sensor to the temperature measurement output unit).

In accordance with the temperature measuring device 200 and the temperature measuring method according to the first embodiment, by way of using the temperature sensor 80, it is possible to enhance the ease of attachment and removal of the temperature sensor 80 including the thermal anchor and to suppress the breakage of the lead wire 84 at the time of the attachment and the removal. In addition, fatigue wire breakage of the lead wire 84 during the thermal expansion or contraction of the refrigeration medium 35 can be suppressed. Further, since the temperature sensor 80 is attached, as a reference temperature sensor for controlling the temperature of the refrigerator, to the refrigeration medium 35 disposed near the gap G, the temperature of the gap G can be adjusted with a minimum time delay.

(Temperature Measuring Device and Temperature Measuring Method According to Second Embodiment)

Next, an example of a temperature measuring device and a temperature measuring method according to the second embodiment will be described with reference to FIG. 6. Here, FIG. 6 is a schematic view showing an example of the temperature measuring device according to the second embodiment.

Figure 6:
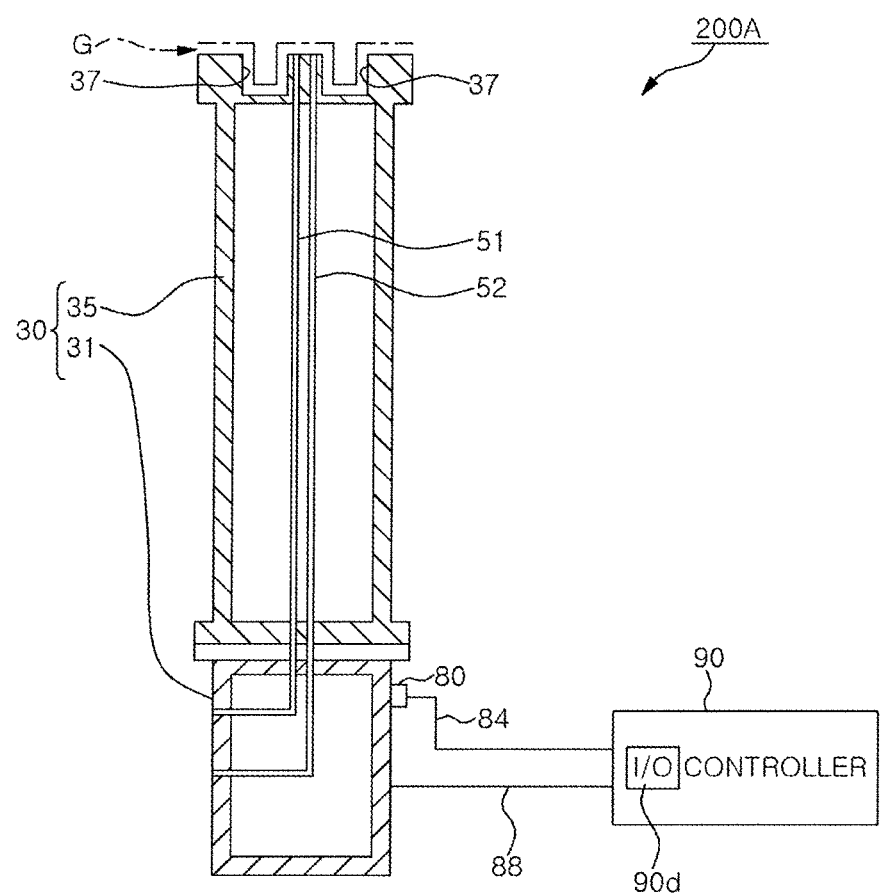
FIG. 6 schematically illustrates an example of a temperature measuring device according to the second embodiment.

A measurement target whose temperature is measured by a temperature measuring device 200A shown in FIG. 6 is the refrigerator 31 constituting the refrigeration device 30 shown in FIG. 1. The temperature measuring device 200A has the same configuration as that of the temperature measuring device 200 except that the temperature sensor 80 is attached to the refrigerator 31.

The controller 90 controls the temperature of the gap G above the refrigeration medium 35 to a desired temperature based on the temperature measurement data transmitted from the temperature sensor 80. In other words, the temperature sensor 80 is used to control the temperature of the refrigerator 31.

The temperature measurement method according to the second embodiment includes the following steps. First, the temperature sensor 80 is attached to the refrigerator 31 as a measurement target having an extremely low temperature, and the lead wire 84 extending from the temperature sensor 80 is connected to the temperature measurement output unit 90d (the process of attaching the temperature sensor to the measurement target and connecting the lead wire to the temperature measurement output unit).

Next, the temperature of the side surface of the refrigerator 31 is measured by the temperature sensor 80; the temperature measurement data is transmitted to the temperature measurement output unit 90*d* and outputted to a display screen or the like; and the temperature of the refrigerator 31 is controlled based on the temperature measurement data (the process of outputting the temperature measurement data measured by the temperature sensor to the temperature measurement output unit).

In accordance with the temperature measuring device 200A and the temperature measuring method according to the second embodiment, by way of using the temperature sensor 80, it is possible to enhance the ease of attachment and removal of the temperature sensor 80 including the thermal anchor and to suppress the breakage of the lead wire 84 at the time of the attachment and the removal. In addition, fatigue breakage of the lead wire 84 during the thermal expansion or contraction of the refrigeration medium 35 can be suppressed.

The present disclosure is not limited to the configuration described in the above embodiments, and may be applied to another embodiment in which other components are combined with the configuration described in the above embodiments. With respect to these aspects, the gist of the present disclosure can be changed without departing from the scope of the present disclosure, and can be appropriately determined depending on the application.

For example, in the above embodiments, the case where the measurement target whose temperature is measured by the temperature sensors 80 and 80A is the refrigeration device 30 constituting the substrate processing apparatus 100 has been described as an example. However, the measurement target may be, e.g., various devices disposed at a room temperature, other than the refrigeration device 30.

While certain embodiments have been described, these embodiments have been presented by way of example only, and are not intended to limit the scope of the disclosures. Indeed, the embodiments described herein may be embodied in a variety of other forms. Furthermore, various omissions, substitutions and changes in the form of the embodiments described herein may be made departing from the spirit of the disclosures. The accompanying claims and their equivalents are intended to cover such forms or modifications as would fall within the scope and spirit of the disclosures.

What is claimed is:

1. A temperature sensor that is disposed at a measurement target having an extremely low temperature and transmits temperature measurement data of the measurement target to a temperature measurement output unit, the temperature sensor comprising:
   a housing;
   an electric resistor disposed in the housing;
   a lead wire extending from the electric resistor and connected to the temperature measurement output unit; and
   a thermal anchor portion formed by fixing a part of the lead wire to inside or outside the housing.

2. The temperature sensor of claim 1, wherein another part of the lead wire is curved between the electric resistor and the thermal anchor portion in the housing.

3. The temperature sensor of claim 2, wherein a functional member for promoting thermal conductivity between the measurement target and the housing and suppressing a contact thermal resistance therebetween is disposed on a side surface of the housing to be attached to the measurement target.

4. The temperature sensor of claim 3, wherein the measurement target is at least one of a refrigerator and a refrigeration medium laminated on the refrigerator, the refrigerator and the refrigeration medium constituting a refrigeration device having an extremely low temperature.

5. The temperature sensor of claim 2, wherein the measurement target is at least one of a refrigerator and a refrigeration medium laminated on the refrigerator, the refrigerator and the refrigeration medium constituting a refrigeration device having an extremely low temperature.

6. The temperature sensor of claim 1, wherein a functional member for promoting thermal conductivity between the measurement target and the housing and suppressing a contact thermal resistance therebetween is disposed on a side surface of the housing to be attached to the measurement target.

7. The temperature sensor of claim 6, wherein the measurement target is at least one of a refrigerator and a refrigeration medium laminated on the refrigerator, the refrigerator and the refrigeration medium constituting a refrigeration device having an extremely low temperature.

8. The temperature sensor of claim 1, wherein the measurement target is at least one of a refrigerator and a refrigeration medium laminated on the refrigerator, the refrigerator and the refrigeration medium constituting a refrigeration device having an extremely low temperature.

9. The temperature sensor of claim 1, wherein the thermal anchor portion is formed by fixing the part of the lead wire to an inner wall surface of the housing or a mounting surface of the housing to be attached to the measurement target.

10. A temperature measuring device comprising:
    a temperature sensor including a housing to be installed at a measurement target having an extremely low temperature, an electric resistor disposed in the housing, a lead wire extending from the electric resistor and a thermal anchor portion formed by fixing a part of the lead wire to inside or outside the housing; and
    a temperature measurement output unit,
    wherein the temperature sensor and the temperature measurement output unit are electrically connected by the lead wire.

11. The temperature measuring device of claim 10, wherein a functional member for promoting thermal conductivity between the measurement target and the housing and suppressing a contact thermal resistance therebetween is disposed between the measurement target and the housing.

12. The temperature measuring device of claim 11, wherein the measurement target is at least one of a refrigerator and a refrigeration medium laminated on the refrigerator, the refrigerator and the refrigeration medium constituting a refrigeration device having an extremely low temperature, and
    the temperature measurement output unit is disposed in a room temperature atmosphere.

13. The temperature measuring device of claim 12, wherein the temperature measurement output unit is included in a controller configured to control at least a temperature of the refrigerator, and
    the temperature sensor is attached, as a temperature sensor for controlling the temperature of the refrigerator, to the refrigerator.

14. The temperature measuring device of claim 12, wherein the temperature measurement output unit is included in a controller configured to control at least a temperature of the refrigerator, and the temperature sensor is attached, as a reference temperature sensor for controlling the temperature of the refrigerator, to the refrigeration medium.

15. The temperature measuring device of claim 10, wherein the measurement target is at least one of a refrigerator and a refrigeration medium laminated on the refrigerator, the refrigerator and the refrigeration medium constituting a refrigeration device having an extremely low temperature, and the temperature measurement output unit is disposed in a room temperature atmosphere.

16. The temperature measuring device of claim 15, wherein the temperature measurement output unit is included in a controller configured to control at least a temperature of the refrigerator, and the temperature sensor is attached, as a temperature sensor for controlling the temperature of the refrigerator, to the refrigerator.

17. The temperature measuring device of claim 15, wherein the temperature measurement output unit is included in a controller configured to control at least a temperature of the refrigerator, and the temperature sensor is attached, as a reference temperature sensor for controlling the temperature of the refrigerator, to the refrigeration medium.

18. A temperature measuring method comprising:

attaching a temperature sensor to a measurement target having an extremely low temperature, the temperature sensor including a housing to be installed at the measurement target, an electric resistor disposed in the housing, a lead wire extending from the electric resistor and a thermal anchor portion formed by fixing a part of the lead wire inside or outside the housing, and connecting the lead wire to a temperature measurement output unit; and measuring a temperature of the measurement target using the temperature sensor, and transmitting and outputting temperature measurement data of the measurement target to the temperature measurement output unit.

19. The temperature measuring method of claim 18, wherein the measurement target is at least one of a refrigerator and a refrigeration medium laminated on the refrigerator, the refrigerator and the refrigeration medium constituting a refrigeration device having an extremely low temperature, the temperature measurement output unit is included in a controller configured to control at least a temperature of the refrigerator; and the temperature sensor is attached, as a temperature sensor for controlling the temperature of the refrigerator, to the refrigerator.

20. The temperature measuring method of claim 18, wherein the measurement target is at least one of a refrigerator and a refrigeration medium laminated on the refrigerator, the refrigerator and the refrigeration medium constituting a refrigeration device having an extremely low temperature, the temperature measurement output unit is included in a controller configured to control at least a temperature of the refrigerator; and the temperature sensor is attached, as a reference temperature sensor for controlling the temperature of the refrigerator, to the refrigeration medium.

* * * * *